United States Patent [19]

Russell et al.

[11] Patent Number: 4,941,354
[45] Date of Patent: Jul. 17, 1990

[54] TRI-AXIAL ACCELEROMETERS

[76] Inventors: Michael K. Russell, Lynworth House, 54 High Street, Prestbury, Cheltenham, England; Anthony W. Russell, Drachlaw, Turriff, Aberdeenshire, Scotland

[21] Appl. No.: 279,936
[22] Filed: Dec. 5, 1988
[30] Foreign Application Priority Data Dec. 4, 1987 [GB] United Kingdom ............... 8728442

[51] Int. Cl.$^5$ ............................................. G01P 15/13
[52] U.S. Cl. ................................ 73/517 B; 73/517 R
[58] Field of Search .............. 73/516 R, 517 R, 517 B

[56] References Cited

U.S. PATENT DOCUMENTS

| 4,397,185 | 8/1983 | Craig et al. ................. 73/517 B |
| 4,398,418 | 8/1983 | Shutt et al. ................. 73/517 B |
| 4,584,885 | 4/1986 | Cadwell . | |

FOREIGN PATENT DOCUMENTS

WO87/03083  5/1987  PCT Int'l Appl. .
1492142    11/1977  United Kingdom .

Primary Examiner—John Chapman
Attorney, Agent, or Firm—Young & Thompson

[57] ABSTRACT

An accelerometer has a moving magnet within a housing. The magnet is mounted within a support member connected to the center of a diaphragm so as to permit movement of the magnet along a measurement axis extending in the axial direction of the support member by deformation of the diaphragm and so as to permit movement of the magnet along two mutually orthogonal measurement axes parallel to the diaphragm by flexing of the diaphragm to allow for pivoting of the support member. Furthermore displacement of the magnet with respect to the three mutually transverse measurement axes in response to an applied force is sensed by a pickoff capacitor, and a respective output signal proportional to the component of the applied force along each of the measurement axes is supplied by associated sensing circuitry. Simultaneously the magnet is restored to its null position by associated force coil pairs. The use of a single magnet for measurement along the three axes renders the accelerometer of high accuracy and decreases the size of the measurement assembly.

7 Claims, 2 Drawing Sheets

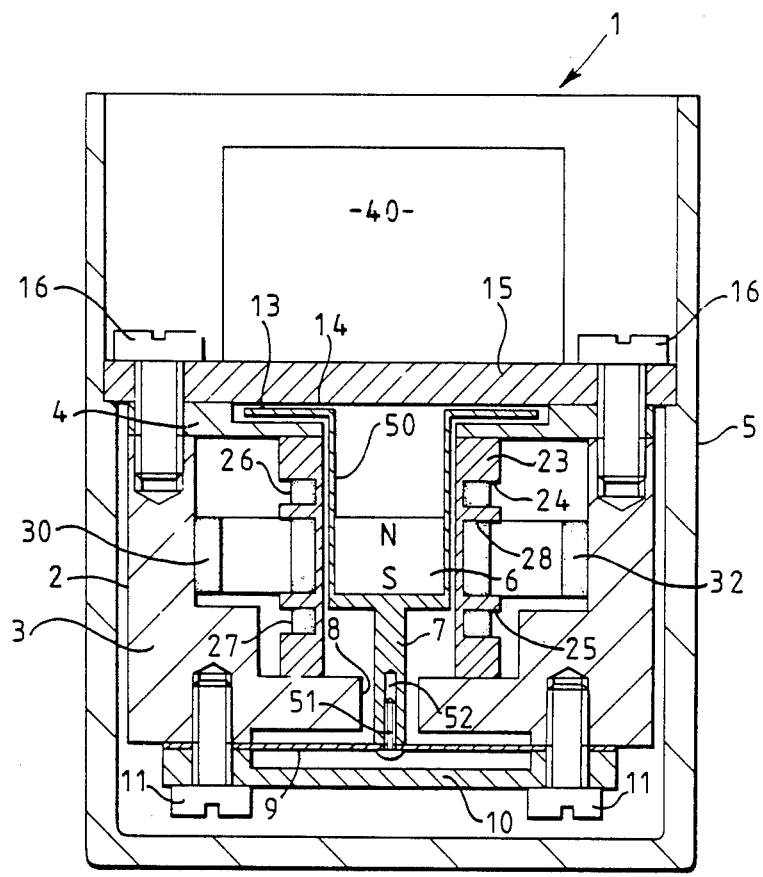
FIG 1
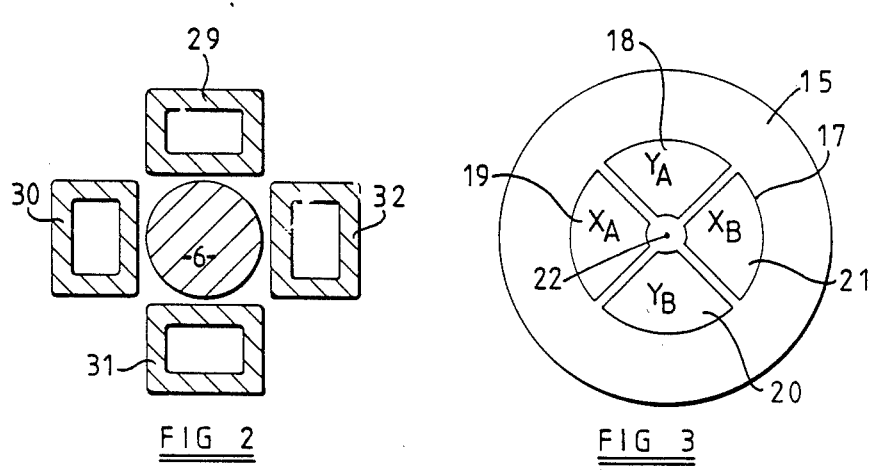
FIG 2
FIG 3

TRI-AXIAL ACCELEROMETERS

BACKGROUND OF THE INVENTION

This invention relates to tri-axial accelerometers.

For measurement of three mutually transverse components of acceleration or applied force, such as the components of the earth's gravitational field g, it is known to use a tri-axial accelerometer package comprising three single-axis accelerometers arranged so that their axes of sensitivity are mutually orthogonal. Each accelerometer comprises a respective permanent magnet displaceable with respect to a null position along its axis of sensitivity, and sensing means for detecting such displacement and for providing an output signal indicative of the component of the applied force along the axis of sensitivity.

However, when the outputs of the three accelerometers of such a package are used to perform a calculation, for example in order to determine the inclination of a borehole, it is necessary to determine the magnet temperature coefficient of each accelerometer and to apply appropriate corrections to compensate for differences in the variation of the scale factors of the three accelerometers with temperature, since the magnet temperature coefficients of the three accelerometers will differ.

It is an object of the invention to provide an improved form of tri-axial accelerometer.

SUMMARY OF THE INVENTION

According to the present invention there is provided a tri-axial accelerometer comprising a housing, a magnet mounted within the housing so as to be displaceable with respect to three mutually transverse measurement axes in response to an applied force, and sensing means for sensing displacement of the magnet and for providing a respective output signal proportional to the component of the applied force along each of the three measurement axes.

Since only a single magnet is used for measurement along the three axes, the variation of scale factor with temperature due to the magnet temperature coefficient is identical for all three axes. This greatly simplifies temperature matching of the three axes which is essential for accurate measurement of inclination. The use of a single sensing arrangement, in place of the three previously used, also imparts greater convenience in use and decreases the size of the assembly and the production costs.

The invention also provides a phase sensitive demodulator having two inputs for receiving respective alternating input signals of the same frequency, an output for providing an output signal having an average value proportional to the difference between said input signals, and switching means actuated by a switching signal of the same frequency as said input signals for supplying one of said input signals to said output during one half of each cycle of said switching signal and for supplying the other of said input signals to said output during the other half of each cycle of said switching signal.

BRIEF DESCRIPTION OF THE DRAWINGS

In order that the invention may be more fully understood, a preferred form of tri-axial accelerometer in accordance with the invention will now be described, by way of example, with reference to the accompanying drawings, in which:

FIG. 1 is a vertical section through the accelerometer;

FIG. 2 is a schematic horizontal section through a portion of the accelerometer;

FIG. 3 is a view from below of a fixed capacitor plate of the accelerometer.

DETAILED DESCRIPTION OF THE DRAWINGS

Figure 4:
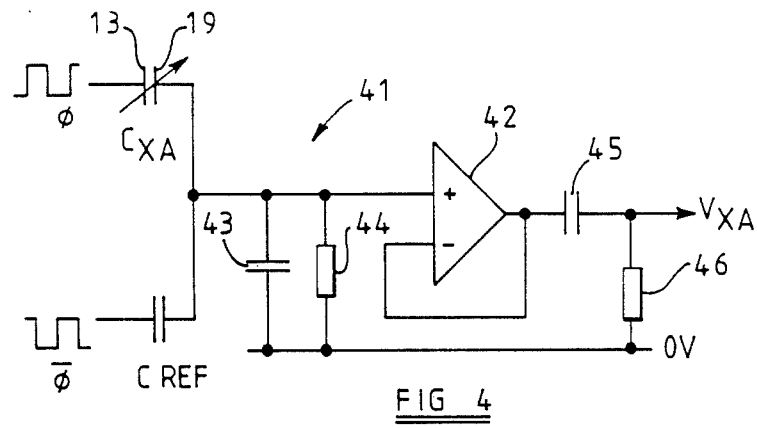
FIGS. 4 to 6 are three diagrams showing parts of the control circuitry of the accelerometer.

Referring to FIG. 1, the illustrated accelerometer 1 comprises an electrically conductive housing 2 made up of a lower housing part 3 and an upper housing part 4, and surrounded by a casing 5 which is electrically insulated from the housing 2. The casing 5 is made from a soft magnetic alloy, such as radiometal, in order to provide magnetic screening.

A samarium-cobalt permanent magnet 6 is mounted within the housing 2 by being received in a cylindrical bore 50 in an electrically conductive support member 7 which extends through a central aperture 8 in the lower housing part 3. The support member 7 is connected to the centre of an electrically conductive circular support diaphragm 9 by means of a screw 51 extending through the diaphragm 9 into a screwthreaded bore 52 in the support member 7. Movement of the magnet 6 in the axial direction of the support member 7, that is along a Z measurement axis, is permitted by deformation of the diaphragm 9 in a direction perpendicular to the plane of the diaphragm 9. Furthermore movement of the magnet 6 laterally with respect to the axis of the support member 7, that is along mutually orthogonal X and Y measurement axes in a plane parallel to the diaphragm 9, is permitted by flexing of the diaphragm 9 so as to allow for pivoting of the support member 7 about the center of the diaphragm 9.

The diaphragm 9 is chemically milled from thin sheet spring material and is provided with a milled pattern designed to provide minimum restraint to axial and pivoting movements of the support member 7, whilst retaining lateral stiffness. The diaphragm 9 is clamped at its edge by a diaphragm clamp plate 10 secured to the lower housing part 3 by screws 11.

The upper part of the support member 7 is provided with an annular flange constituting a movable plate 13 of a pickoff capacitor 14. The capacitor 14 also comprises a fixed circular plate formed on the underside of a circuit board 15 by the conventional printed circuit process and secured to the housing 2 by screws 16. The screws 16 also connect together the lower and upper housing parts 3 and 4. As shown in FIG. 3 the fixed plate 17 comprises four plate portions 18, 19, 20 and 21 electrically insulated from one another and arranged in a common plane around a central point 22.

A generally cylindrical coil former 23 is also mounted within the housing 2 so as to surround the magnet 6. The outer surface of the coil former 23 is formed with upper and lower annular slots 24 and 25 within which a pair of circular Z force coils 26 and 27 are wound. The force coils 26 and 27 are connected together in series and in such a sense that a current flowing through the force coils 26 and 27 produces forces acting on the magnet 6 which are in the same direction.

The outer surface of the coil former 23 is also formed with a central annular slot 28 which receives four lateral force coils 29, 30, 31 and 32 arranged around the magnet 6, as best seen in FIG. 2 which shows a schematic horizontal section through the magnet 6 and the lateral force coils 29, 30, 31 and 32. In order to produce a lateral force on the magnet 6 the lateral coils need to have a part of their conductors in the high axial field at the edge of the magnet 6 and the remainder of the coil away from the magnet. One possible arrangement for achieving this is shown in FIG. 2. The coils 30 and 32 constitute a pair of X force coils, and the coils 29 and 31 constitute a pair of Y force coils. Again the coils of each pair are connected in series and in such a sense that a current flowing through the coils produces forces acting on the magnet 6 which are in the same direction.

Referring again to FIG. 3, if the four plate portions 18 to 21 of the pickoff capacitor 14 are denoted YA, XA, YB and XB, and the capacitances between each of these plate portions and the movable plate 13 are denoted $C_{YA}$, $C_{XA}$, $C_{YB}$ and $C_{XB}$, the effect of movements $\Delta X$, $\Delta Y$ and $\Delta Z$ respectively along the X, Y and Z axes is to cause a capacitance change proportional to the deflection such that:

$$\Delta X \; \alpha \; C_{XA} - C_{XB}$$
$$\Delta Y \; \alpha \; C_{YA} - C_{YB}$$
$$\Delta Z \; \alpha \; C_{XA} + C_{XB} + C_{YA} + C_{YB}$$

Thus axial movement of the magnet 6 will change the capacitance between the movable plate 13 and the fixed plate 17, and lateral movement of the magnet 6 will cause a differential capacitance change between the movable plate 13 and opposite plate portions 19 and 21 or 18 and 20, as the case may be.

Control circuitry 40 is mounted above the circuit board 15. The control circuitry 40 includes a respective pickoff amplifier circuit associated with each of the plate portions 18 to 21. The pickoff amplifier circuit 41 associated with the plate portion 19 is shown in FIG. 4. In operation the movable plate 13 is excited with a square wave voltage $\Phi$ of relatively high frequency (typically 30 kHz), the voltage being applied to the plate 13 by way of the housing 2, the diaphragm 9, and the support member 7. Furthermore a square wave voltage $\Phi$ of the same amplitude and frequency but of opposite phase is simultaneously supplied to a fixed reference capacitor $C_{REF}$ of a capacitance value equal to the capacitance value of $C_{XA}$ when the movable plate 13 is in its null position. The junction of the plate portion 19 and the capacitor $C_{REF}$ is connected to a unity gain buffer amplifier 42, incorporating a shunt capacitor 43, a high value input resistor 44, a blocking capacitor 45 and a resistor 46. The output of the buffer amplifier 42 provides a square wave output voltage $V_{XA}$ which is proportional to $C_{XA}-C_{REF}$.

If the magnet 6 is moved from its null position in such a manner as to increase the gap between the movable plate 13 and the plate portion 19 so that $C_{XA}$ is less than $C_{REF}$, $V_{XA}$ will be 180° out of phase with the excitation voltage $\Phi$, and conversely, if the magnet 6 is moved from its null position in such a manner as to decrease this gap so that $C_{XA}$ is greater than $C_{REF}$, $V_{XA}$ will be in phase with $\Phi$. Output voltages $V_{XB}$, $V_{YA}$ and $V_{YB}$ are supplied by similar pickoff amplifier circuits associated with the plate portions 21, 18 and 20 respectively.

The control circuitry 40 also includes three force balance circuits respectively associated with the three measurement axes X, Y and Z for supplying currents to the force coil pairs 30, 32; 29, 31; and 26, 27 associated with the three measurement axes X, Y and Z so as to urge the magnet 6 towards its null position and for providing output voltages $V_X$, $V_Y$ and $V_Z$ indicative of the components of the applied force along the three measurement axes.

Figure 5:
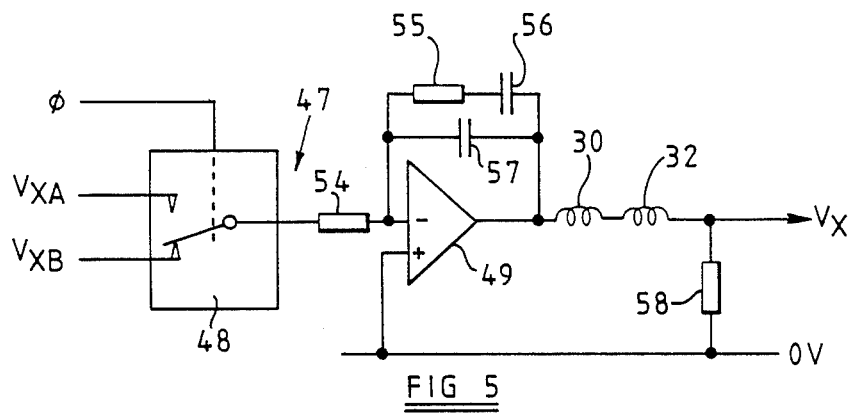

FIG. 5 shows the X force balance circuit 47. It will be appreciated that the restoring force required to be applied to the magnet 6 along the X axis will be determined by the current applied to the X force coils 30 and 32 which will have a direction determined by the differential change in capacitance $C_{XA}-C_{XB}$ between opposite plate portions 19 and 21 of the pickoff capacitor 14 due to the X lateral movement of the magnet 6. Accordingly the circuit 47 includes a phase sensitive demodulator 48 having two inputs to which the voltages $V_{XA}$ and $V_{XB}$ outputted by the appropriate pickoff amplifier circuits are applied and an output supplying an output voltage having an average value proportional to the difference between $V_{XA}$ and $V_{XB}$. To this end the demodulator 48 includes a switch which is actuated by the excitation voltage $\Phi$ so as to switch the output between the two inputs of the demodulator 48 in synchronism with the input voltages $V_{XA}$ and $V_{XB}$. Thus the output of the demodulator 48 corresponds to $V_{XA}$ for one half of each cycle and to $V_{XB}$ for the other half of each cycle.

The output of the demodulator 48 is supplied by way of a resistor 54 to a high gain amplifier 49 incorporating a filter network comprising a resistor 55 and two capacitors 56 and 57.

The amplifier 49 provides a d.c. output dependent on the difference between the square wave voltages $V_{XA}$ and $V_{XB}$ which produces a restoring current through the X force coils 30 and 32 and a current sense resistor 58. The direction of the current through the force coils 30 and 32 is such that the magnet 6 is driven towards its null position in which the movable plate 13 of the pickoff capacitor 14 is symmetrically disposed with respect to the plate portions 19 and 21.

Furthermore the current required to restore the magnet 6 to its null position is a measure of the component of the applied force acting along the X axis. Thus the current across the current sense resistor 58 gives an output voltage $V_X$ indicative of the X component of the applied force. It should be stressed that, because the amplifier 49 is of very high gain, the sensitivity of the force balance circuit is very great, and in practice the required output voltage is produced with negligible movement of the magnet 6 along the X axis.

The Y force balance circuit is similar in construction and operation to the X force balance circuit 47 shown in FIG. 5.

Figure 6:
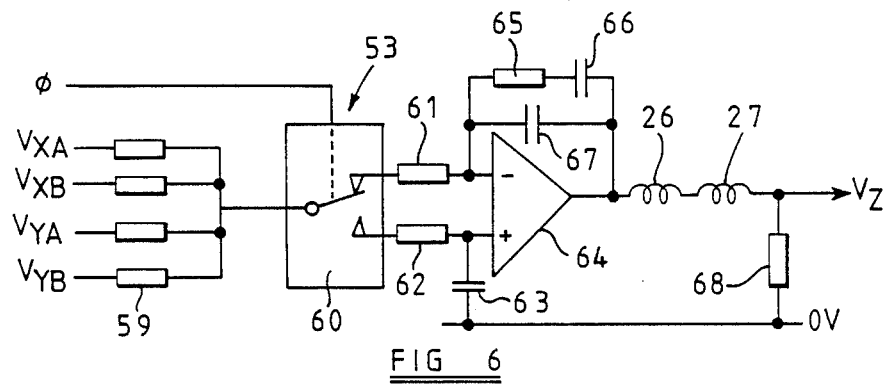

FIG. 6 shows the Z force balance circuit 53. It will be appreciated that the restoring force to be applied to the magnet 6 along the Z axis will be determined by the current applied to the Z force coils 26 and 27 which will have a direction determined by the change in capacitance across the plates 13 and 17 of the pickoff capacitor 14 due to displacement of the magnet 6 along the Z axis, and thus by the sum $V_{XA}+V_{XB}+V_{YA}+V_{YB}$ of the voltages outputted by the four pickoff amplifier circuits. Accordingly the outputs $V_{XA}$, $V_{XB}$, $V_{YA}$ and $V_{YB}$ of the pickoff amplifier circuits are applied to a summing network 59 comprising four resistors s as to provide an output proportional to the sum of these voltages which is applied to a phase sensitive demodulator 60 having two outputs. Each output of the demodulator 60 corresponds to the input for a respective half of each cycle of the excitation voltage Φ, and is supplied to a respective input of a high gain differential amplifier 54 by way of a resistor 61 or 62. The amplifier 64 incorporates a shunt capacitor 63 and a filter network comprising a resistor 65 and two capacitors 66 and 67.

The amplifier 64 provides a d.c. output dependent on the sum of the square wave voltages $V_{XA}$, $V_{XB}$, $V_{YA}$ and $V_{YB}$ which produces a restoring current through the Z force coils 26 and 27 and a current sense resistor 68. The direction of the current through the force coils 26 and 27 is such as to cause a force to be applied to the magnet 6 along the Z axis restoring the magnet 6 to its null position in which the movable plate 13 is at a predetermined distance from the fixed plate 17 of the pickoff capacitor 14. Furthermore the current across the current sense resistor 68 produces an output voltage $V_Z$ indicative of the Z component of the applied force. Again, because of the high gain of the amplifier 64, the required output voltage is produced with negligible movement of the magnet 6 in practice.

Various modifications of the above described accelerometer are possible within the scope of the invention. For example, the fixed plate 17 of the pickoff capacitor 14 may comprise three separate plate portions instead of the four plate portions described.

We claim:

1. A tri-axial moving magnet accelerometer comprising a housing, a magnet mounted within the housing so as to be displaceable with respect to three mutually transverse measurement axes in response to an applied force, said magnet being mounted on a support member which is coupled to the housing by a planar diaphragm so as to allow for pivoting of said support member in the directions of two of said measurement axes by flexing of said diaphragm and so as to permit linear displacement of said support member in the direction of the third of said measurement axes by deformation of said diaphragm perpendicularly to the plane of said diaphragm, and sensing means for sensing displacement of said magnet and for providing a respective output signal proportional to the component of the applied force along each of said three measurement axes.

2. An accelerometer according to claim 1, wherein said sensing means includes a variable capacitor comprising a movable plate coupled to said magnet and a fixed plate coupled to said housing, the capacitance across said plates varying in dependence on displacement of said magnet with respect to said three measurement axes.

3. An accelerometer according to claim 2, wherein at least one of said plates comprises a plurality of plate portions electrically insulated from one another and arranged in a common plane around a central point, the relative values of the capacitance between said plate portions and the other of said plates varying in dependence on displacement of said magnet along two of said measurement axes substantially parallel to said common plane, and the absolute values of said capacitance varying in dependence on displacement of said magnet along a third of said measurement axes perpendicular to said common plane.

4. An accelerometer according to claim 3, wherein said sensing means includes a respective reference capacitor associated with each of said plate portions and respective difference means for providing a respective difference signal dependent on the difference between the capacitance of said reference capacitor and the capacitance between said plate portion and said other plate.

5. An accelerometer according to claim 4, wherein said sensing means includes differential means for determining the differential change in capacitance between two of said plate portions on displacement of said magnet along one of said measurement axes substantially parallel to said common plane, said differential means comprising a phase sensitive demodulator having two inputs for receiving respective alternating input signals of the same frequency, each of said input signals being supplied by said difference means so as to have a value dependent on the capacitance between a respective one of said two plate portions and said other plate, an output for providing an output signal having an average value proportional to the difference between said input signals, and switching means actuated by a switching signal of the same frequency as said input signals for supplying one of said input signals to said output during one half of each cycle of said switching signal and for supplying the other of said input signals to said output during the other half of each cycle of said switching signal.

6. A tri-axial moving magnet accelerometer comprising a housing, a permanent magnet disposed within said housing, a flexural mounting element attached to said housing and mounting said magnet so that said magnet is displaceable with respect to three mutually transverse measurement axes in response to an applied force, said magnet being mounted on a support member which is pivotally coupled to said housing by said mounting element so as to allow for pivoting of said support member in the directions of two of said measurement axes, said support member being linearly displaceable in the direction of the third of said measurement axes, and said support member being mounted on a planar diaphragm constituting said mounting element so as to be pivotal in the directions of said two measurement axes by flexing of said diaphragm and so as to be linearly displaceable in the direction of said third measurement axis by deformation of said diaphragm perpendicularly to the plane of said diaphragm, sensing means for sensing displacement of said magnet for providing a respective output signal proportional to the component of the applied force along each of said three measurement axes, and force balance coils responsive to displacement of said magnet for applying a respective restoring force to said magnet along each of said three measurement axes in order to urge said magnet towards a null position.

7. A tri-axial moving magnet accelerometer comprising a housing, a permanent magnet disposed within said housing, a flexural mounting element attached to said housing and mounting said magnet so that said magnet is displaceable with respect to three mutually transverse measurement axes in response to an applied force, sensing means for sensing displacement of said magnet and for providing a respective output signal proportional to the component of the applied force along each of said three measurement axes, and force balance coils responsive to displacement of said magnet for applying a respective restoring force to said magnet along each of said three measurement axes in order to urge said magnet towards a null position, said force balance coils comprising a respective pair of force coils associated with each of said measurement axes, the coils of each said pair being spaced apart along the associated measurement axis with said magnet therebetween.

* * * * *